March 18, 1941.    W. W. SLOANE    2,235,650
SHAKER CONVEYER
Filed May 17, 1940

INVENTOR
William W. Sloane
BY Clarence F. Poole
ATTORNEY

Patented Mar. 18, 1941

2,235,650

UNITED STATES PATENT OFFICE 2,235,650

SHAKER CONVEYER

William W. Sloane, Chicago, Ill., assignor to Goodman Manufacturing Company, Chicago, Ill., a corporation of Illinois Application May 17, 1940, Serial No. 335,651

9 Claims. (Cl. 198—220)

This invention relates to improvements in shaker conveyers, and more particularly to an adjustable trough supporting and aligning means for a shaker conveyer trough line adapted to be secured between the floor and roof of a mine, to hold the trough line in longitudinal and transverse alignment.

The principal objects of my invention are to provide a novel and simplified form of trough supporting and guiding means for a shaker conveyer trough line including a plurality of spaced apart jacks having supporting and guiding means for the conveyer trough mounted thereon in such a manner as to yieldably hold the trough sections in longitudinal alignment with respect to the conveyer trough line and to relieve side thrusts on the trough supporting and guiding means.

Other objects of my invention will appear from time to time as the following specification proceeds and with reference to the accompanying drawing wherein.

Figure 1:
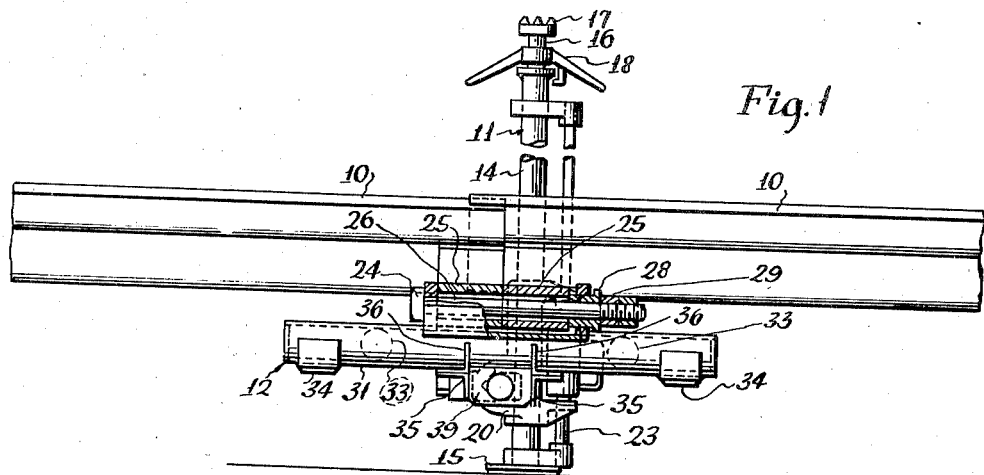
Figure 1 is a fragmentary view in side elevation showing adjacent ends of two trough sections of the shaker conveyer trough line supported by a trough supporting and aligning means constructed in accordance with my invention.
Figure 2:
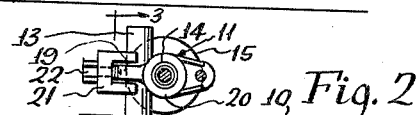
Figure 2 is a fragmentary plan view of adjacent ends of the troughs shown in Figure 1.

Referring now to the embodiment of my invention illustrated in the drawing, adjacent ends of a pair of connected trough sections 10, 10 are shown as being supported and guided on a pair of spaced apart supporting jacks 11, 11, on a guide frame generally indicated by reference character 12. Said guide frame is rockingly mounted on a transverse shaft 13, adjustably supported between said jacks in a manner which will hereinafter more clearly appear as this specification proceeds.

The jacks 11, 11 are of a usual construction, each consisting of a sleeve 14 mounted on a foot 15 adapted to engage the ground. A threaded shaft 16, having a roof engaging member 17 on the upper end thereof, extends within said sleeve and is telescoped within or extended from said sleeve by means of a wing nut 18 threaded on said shaft and held from vertical movement with respect to said sleeve.

The shaft 13 is mounted on the spaced jacks 11, 11 by means of suitable clamping means, which include straps 19, 19 projecting from adjusting members 20, 20 slidably mounted on the jack sleeves 14, 14. The ends of the shaft 13 are adapted to extend through said straps and the clearance between said straps and shaft is sufficient to permit a substantial amount of angular movement of said jacks with respect to said shaft, and thus permit accurate alignment of the trough sections, without binding, when the jacks are secured between the mine roof and floor at various angular positions with respect to each other.

U-shaped clamping members 21, 21 are provided to secure the shaft 13 and adjusting members 20, 20 in position along the sleeves 14, 14. The ends of each clamping member extend along opposite sides of the strap 19 and are of a fishtail formation, to firmly engage the shaft 13 and clamp said shaft to said sleeve. A machine screw 22 threaded in the strap 19 is provided to tighten said clamping member against said shaft.

The adjusting members 20, 20 are adjustably moved along the jacks 11, 11 by means of lifting jacks generally indicated by reference characters 23, 23 (see Figure 1). Said lifting jacks are of a construction similar to the well-known form of automobile type of friction bumper jack and are no part of my present invention so need not herein be shown or described in detail.

The trough sections 10, 10, as herein shown, are connected together by connecting bolts 24, 24 extending through spaced eyes 25, 25 projecting laterally from the lower sides of adjacent ends of said trough sections. As herein shown, said trough sections are adapted to be supported on said eyes on the ball and guide frame 12 in longitudinally extending sockets 26, 26, which are adapted to receive said eyes. Said sockets are provided on the upper sides of an upper frame 27 of said ball frame and the ends thereof are apertured to permit the connecting bolts 24, 24 to pass therethrough. As herein shown, the apertured portion of one end of said socket is larger than that of the other end, to receive a sleeve 28 on said bolt. Said sleeve is adapted to abut an end of one of the eyes 25 and hold said eyes in abutting relation with respect to each other (see Figure 1). Lock nuts 29, 29 are threaded on said bolts to engage said sleeve with said eyes and to hold said eyes in said sockets.

The upper frame portion 27 of the ball frame 12 is provided with a pair of laterally spaced semicylindrical guides 30, 30 extending longitudinally of the conveyer and facing corresponding lower guides 31, 31 of a lower frame portion of said ball frame. Balls 33, 33 are adapted to be received in said guides, to form an anti-friction support for said upper frame on said lower frame and to permit said upper frame to be reciprocably moved with respect to said lower frame.

Referring now in particular to the novel form of supporting connection between the lower frame portion of the guide frame 12 and the jacks 11, 11, permitting said guide frame to rock with respect to said jacks and yieldably move in a transverse direction, the guides 31, 31 of said lower frame portion are connected together by spacing and connecting members 34, 34. A pair of spaced apart frame members 35, 35, herein shown as being angle irons, extend transversely of said lower guides and are secured to the underside thereof on angle irons 36, 36 and gusset plates 37, 37. Said angle irons are secured at the ends of their legs to said guides in a suitable manner, such as welding, and said frame members are welded to the horizontal legs of said angle irons and depend therefrom. End spacing members 39, 39 and spaced apart intermediate spacing members 40, 40 are provided to hold said frame members in spaced apart relation with respect to each other. Said spacing members are apertured to receive the transverse shaft 13, which is adapted to be clamped to the jacks 11, 11 at its ends in the hereinbefore described manner.

Figure 4:
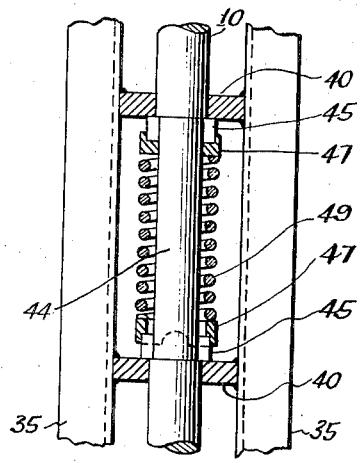
Figure 4 is an enlarged detail view showing the means for yieldably holding the troughs in longitudinal alignment.
Figure 5:
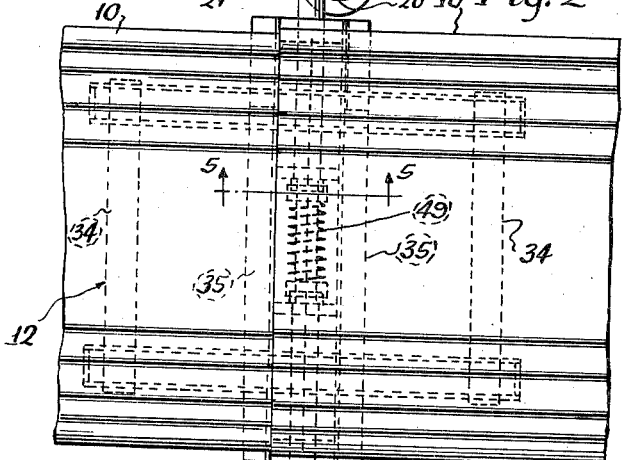
Figure 5 is a partial fragmentary sectional view taken substantially along line 5—5 of Figure 2.
Figure 3:
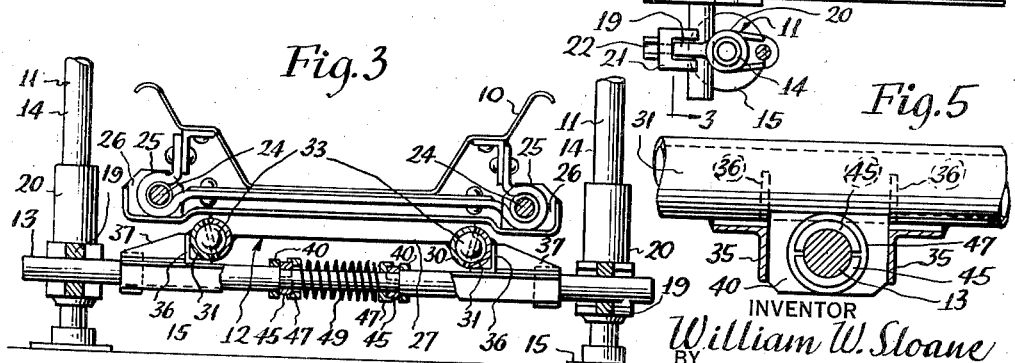
Figure 3 is a transverse sectional view taken substantially along line 3—3 of Figure 2.

The transverse shaft 13 is provided with a reduced central portion 44 extending between the spacing members 40, 40 (see Figure 4). A pair of split collars 45, 45 are adapted to be mounted on said reduced central portion and to abut the shouldered portions of said shaft. Said split collars are held to said shaft by means of shouldered retaining members 47, 47 extending around said split collars. A compression spring 49 is interposed between said retaining members to hold said retaining members in engagement with said split collars, and to yieldably hold said ball frame in transverse alignment with respect to said jacks.

It may be seen from the foregoing that the ball frame 12 is rockingly mounted on the transverse shaft 13 and that side thrusts on said ball frame, which may be caused when a loading trough at the forward end of the trough line is swung laterally for gathering material from either side of the trough line, will be relieved by the compression spring 49. Thus, any side thrusts on the ball frames supporting the trough line on the jacks 11, 11 will be taken by the compression springs 49, and a certain amount of yieldable movement of said ball frames will be permitted in a lateral direction, but said springs will align the trough line in a longitudinal direction when these side thrusts have been relieved.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer trough support, a transverse shaft, a frame including a lower member rockably mounted on said shaft and an upper member reciprocably movable with respect to said lower member for reciprocably supporting a conveyer trough section on said shaft and for guiding said trough section for reciprocable movement in a longitudinal direction, and yieldable means connected between said shaft and lower member and adapted to yield upon the imparting of lateral thrusts on said frame, for yieldably holding said frame in position on said shaft.

2. In a shaker conveyer trough support, a transverse shaft, a frame including a lower member rockably mounted on said shaft and an upper member reciprocably movable with respect to said lower member for reciprocably supporting a conveyer trough section on said shaft and for guiding said trough section for reciprocable movement in a longitudinal direction, and a compression spring encircling said shaft and having engagement therewith and with said lower member, for yieldably holding said frame in position on said shaft.

3. In a shaker conveyer trough support, a pair of spaced apart supporting jacks adapted to be interposed between a mine roof and floor, a shaft extending between said jacks and adjustably secured thereto, means rockably mounted on said shaft for reciprocably supporting adjacent ends of a pair of trough sections on said shaft and for guiding said trough sections for reciprocable movement in a longitudinal direction, and yieldable means adapted to yield upon lateral thrusts on said trough supporting and guiding means, for yieldably holding said trough supporting and guiding means in position on said shaft between said jacks.

4. In a trough support for shaker conveyers, a pair of spaced apart supporting jacks adapted to be interposed between a mine roof and floor, a shaft extending between said jacks and adjustably secured thereto, means rockably mounted on said shaft for reciprocably supporting adjacent ends of a pair of trough sections thereon and for guiding said trough sections for reciprocable movement in a longitudinal direction, yieldable means on said shaft and engaging said trough supporting and guiding means for yieldably holding said trough supporting and guiding means in alignment between said jacks.

5. In a trough support for shaker conveyers, a pair of spaced apart supporting jacks adapted to be interposed between a mine roof and floor, a shaft extending between said jacks and adjustably secured thereto, means rockably mounted on said shaft for reciprocably supporting adjacent ends of a pair of trough sections thereon and for guiding said trough sections for reciprocable movement in a longitudinal direction, and a compression spring on said shaft having engagement with said trough supporting and guiding means at its ends for yieldably holding said trough supporting and guiding means in transverse alignment between said jacks.

6. In a trough support for shaker conveyers, an upper frame member, a rigid connection between said upper member and adjacent ends of a pair of trough sections of the conveyer, a lower frame member, rolling members having guiding engagement with said upper and lower frame members, for supporting and guiding said upper frame member for slidable movement with respect to said lower frame member in a longitudinal direction, and rocking support means for said lower frame member adapted to hold said trough sections in longitudinal and transverse alignment but to permit a limited amount of yieldable movement of said trough sections in a transverse direction, to relieve side thrusts on said upper and lower frame members.

7. In a trough support for shaker conveyers, an upper frame member, a rigid connection between said upper member and adjacent ends of a pair of trough sections of the conveyer, a lower frame member, rolling members having guiding engagement with said upper and lower frame members, for supporting and guiding said upper frame member for slidable movement with respect to said lower frame member in a longitudinal direction, and rocking support means for said lower frame member adapted to hold said trough sections in longitudinal and transverse alignment but to permit a limited amount of yieldable movement of said trough sections in a transverse direction, to relieve side thrusts on said upper and lower frame members including a transversely extending shaft forming a rocking support for said lower frame member, and yieldable means reacting against said shaft and adapted to engage said lower frame member, to yieldably hold said lower frame member from movement in a lateral direction.

8. In a trough support for shaker conveyers, an upper frame member, a rigid connection between said upper member and adjacent ends of a pair of trough sections of the conveyer, a lower frame member, rolling members having guiding engagement with said upper and lower frame members, for supporting and guiding said upper frame member for slidable movement with respect to said lower frame member in a longitudinal direction, and rocking support means for said lower frame member adapted to hold said trough sections in longitudinal and transverse alignment but to permit a limited amount of yieldable movement of said trough sections in a transverse direction, to relieve side thrusts on said upper and lower frame members including a transversely extending shaft forming a rocking support for said lower frame member, and a compression spring encircling said shaft and engaging said lower frame member, said compression spring being adapted to react against said shaft upon lateral thrusting movement of said lower frame member, to yieldably hold said lower frame member in longitudinal alignment with respect to the conveyer.

9. In a trough support for shaker conveyers, an upper frame member, a rigid connection between said upper member and adjacent ends of a pair of trough sections of the conveyer, a lower frame member, rolling members having guiding engagement with said upper and lower frame members, for supporting and guiding said upper frame member for slidable movement with respect to said lower frame member in a longitudinal direction, and rocking support means for said lower frame member adapted to hold said trough sections in longitudinal and transverse alignment but to permit a limited amount of yieldable movement of said trough sections in a transverse direction, to relieve side thrusts on said upper and lower frame members including a pair of spaced apart supporting jacks adapted to be interposed between a mine roof and floor, a transversely extending member adjustably supported on said jacks and forming a rocking support for said lower frame member, and yieldable means engaging said lower frame member and transversely extending member for yieldably holding said lower frame member from movement in a lateral direction.

WILLIAM W. SLOANE.